United States Patent
Lee et al.

(10) Patent No.: US 9,073,576 B2
(45) Date of Patent: Jul. 7, 2015

(54) SYSTEM AND METHOD FOR SMOOTH STEERING OVERRIDE TRANSITION DURING AUTOMATED LANE CENTERING

(75) Inventors: Jin-Woo Lee, Rochester Hills, MI (US); Bakhtiar Brian Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/224,803

(22) Filed: Sep. 2, 2011

(65) Prior Publication Data

US 2013/0060414 A1      Mar. 7, 2013

(51) Int. Cl.
| | |
|---|---|
| *B60W 40/08* | (2012.01) |
| *B62D 1/28* | (2006.01) |
| *B62D 6/00* | (2006.01) |
| *B62D 15/02* | (2006.01) |

(52) U.S. Cl.
CPC ........... *B62D 1/286* (2013.01); *B60T 2201/087* (2013.01); *B60W 40/08* (2013.01); *B60W 2520/14* (2013.01); *B62D 6/00* (2013.01); *B60T 2201/08* (2013.01); *B62D 15/025* (2013.01)

(58) Field of Classification Search
CPC ......... B60T 2201/08; B60T 2201/087; B60W 2520/14; B60W 40/08; B62D 1/286; B62D 6/00
See application file for complete search history.

(56) References Cited

U.S. PATENT DOCUMENTS

| | | | | |
|---|---|---|---|---|
| 6,050,359 | A | * | 4/2000 | Mouri et al. .................. 180/415 |
| 6,665,603 | B2 | * | 12/2003 | Jindo et al. ...................... 701/96 |
| 2001/0054519 | A1 | * | 12/2001 | Nishiwaki et al. ............ 180/167 |

(Continued)

FOREIGN PATENT DOCUMENTS

DE      10 2004 057 262 A1      6/2006

(Continued)

OTHER PUBLICATIONS

U.S. Appl. No. 13/224,772, Sep. 2, 2011, Lee et al.
U.S. Appl. No. 13/101,271, May 5, 2011, Lee et al.
Office Action for DE Patent Application No. 102012215228.8 date Aug. 19, 2014.
Office Action for CN Patent Application No. 201210317641.0 dated Jul. 25, 2014.

*Primary Examiner* — Fadey Jabr
*Assistant Examiner* — Thomas Ingram
(74) *Attorney, Agent, or Firm* — Mark S. Cohen; Pearl Cohen; Zedek Latzer Baratz LLP

(57) ABSTRACT

Vehicle steering measurements of a vehicle may be measured. Expected vehicle steering measurements may be calculated, each calculated expected vehicle steering measurement corresponding to one of the measured vehicle steering measurements. At least one difference between one of the measured vehicle steering measurements and its corresponding calculated expected vehicle steering measurement may be calculated. A lower boundary and an upper boundary of at least one override transition zone, each of the override transition zones corresponding to one of the measured vehicle steering measurements and its corresponding calculated expected vehicle steering measurement, may be calculated. Steering control of the vehicle may be gradually transferred from an automatic vehicle control system to a driver of the vehicle over a predetermined period of time when one or more of the calculated differences lie between the calculated lower boundary and the calculated upper boundary of the corresponding override transition zone.

18 Claims, 9 Drawing Sheets

(56) References Cited

U.S. PATENT DOCUMENTS

2002/0087255 A1 7/2002 Jindo et al.
2005/0273215 A1* 12/2005 Kuge ............................... 701/1
2010/0131233 A1 5/2010 Deng et al.
2010/0152952 A1* 6/2010 Lee et al. ....................... 701/29

FOREIGN PATENT DOCUMENTS

| DE | 10 2005 057 251 A1 | 6/2007 |
| DE | 10 2007 020 280 A1 | 11/2008 |
| DE | 10 2007 022 184 A1 | 11/2008 |
| DE | 10 2010 030 164 A1 | 12/2011 |

* cited by examiner

SYSTEM AND METHOD FOR SMOOTH STEERING OVERRIDE TRANSITION DURING AUTOMATED LANE CENTERING

FIELD OF THE INVENTION

The present invention is related to methods and systems to for providing for a smooth transition when overriding an automated steering system or method using, for example, a combination of steering angle, steering torque, vehicle speed, and other data.

BACKGROUND

Many vehicles are equipped with autonomous and/or semi-autonomous driving systems, applications, and/or features. Autonomous and semi-autonomous driving systems may provide automated driving controls that reduce the driver action required for operating the vehicle. Automated lane centering methods, features, and applications, for example, may be activated by the driver while the vehicle is in motion and may maintain the vehicle position in the center of a lane. Adaptive lane centering systems, may maintain a constant lane offset, or vehicle position relative to a lane on the road the vehicle is driving upon. Adaptive lane centering systems may reduce driver fatigue and increase safety by maintaining the vehicle position with respect to the road with reduced driver input.

Safety considerations may be taken into account when designing a vehicle lane centering system or other autonomous driving systems. In order to conform to safety requirements, an adaptive lane centering application may be overridden by the driver. When the driver overrides the vehicle lane centering system, the system relinquishes full steering control of the vehicle to the driver. Many autonomous or semi-autonomous steering control override detection systems and methods, however, may not be reliable and may not accurately detect a vehicle steering override condition. Many vehicle automated steering systems may be less reliable at high and low speeds. For example, at low speed a steering wheel requires higher levels of torque to maneuver, and an autonomous steering feature may falsely interpret a slight steering wheel movement to be a steering override event. At high speed, a vehicle steering system may, for example, be too sensitive and have a high steering override threshold. As a result, a driver may over-steer in order to gain control of the vehicle, and the vehicle steering system override detection system may lag behind the steering wheel input causing a sudden movement or jerk in the steering wheel.

SUMMARY

In accordance with an embodiment of the invention, vehicle steering measurements of a vehicle may be measured. Expected vehicle steering measurements may be calculated, each calculated expected vehicle steering measurement corresponding to one of the measured vehicle steering measurements. At least one difference between one of the measured vehicle steering measurements and its corresponding calculated expected vehicle steering measurement may be calculated. A lower boundary and an upper boundary of at least one override transition zone, each of the override transition zones corresponding to one of the measured vehicle steering measurements and its corresponding calculated expected vehicle steering measurement, may be calculated. Steering control of the vehicle may be gradually transferred from an automatic vehicle control system to a driver of the vehicle over a predetermined period of time when one or more of the calculated differences lie between the calculated lower boundary and the calculated upper boundary of the corresponding override transition zone.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
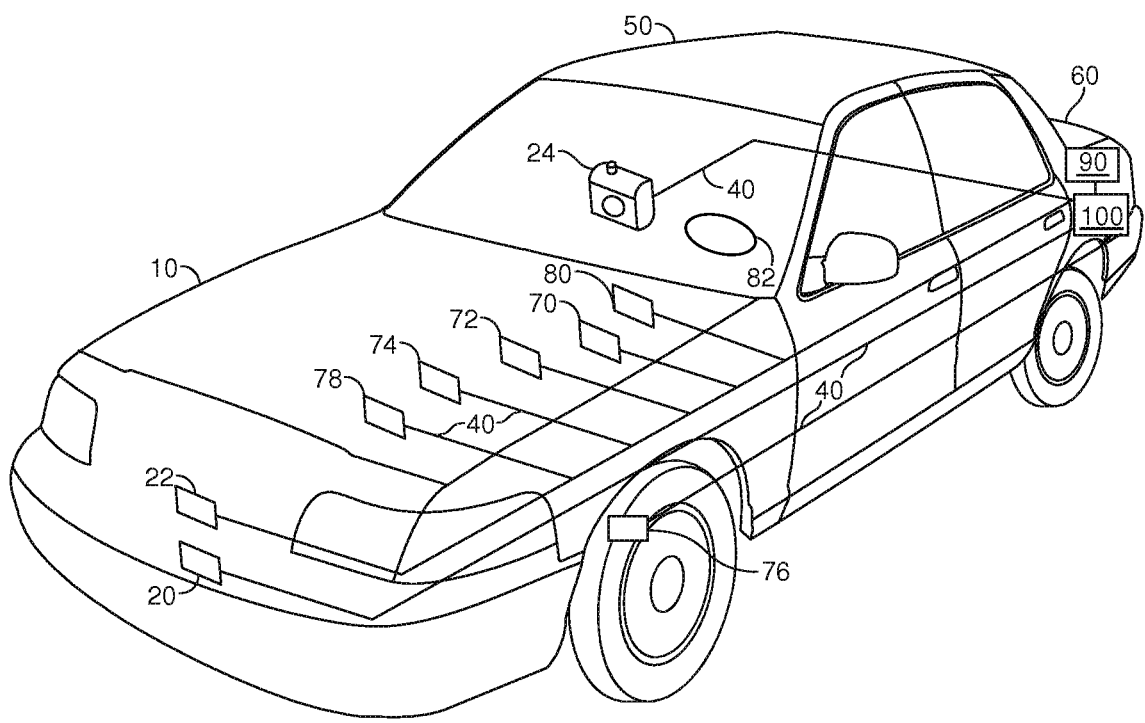
FIG. 1 is a schematic diagram of a vehicle with a vehicle automated steering override detection system according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled, in the art that the present invention may be practiced without these specific details. In other instances, well-known methods, procedures, and components have not been described in detail so as not to obscure the present invention.

Unless specifically stated otherwise, as apparent from the following discussions, throughout the specification discussions utilizing terms such as "processing," "computing," "storing," "calculating," "determining," "evaluating," "measuring," "providing," "transferring," "outputting," "inputting," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Autonomous, semi-autonomous, automated or automatic steering control features (e.g., automated lane centering, adaptive lane centering, etc.) may maintain or control the position of a vehicle with respect to the road with reduced driver input (e.g., steering wheel movement). In order to comply with safety requirements, however, the driver may need to regain full control of the vehicle steering controls and deactivate or disengage the steering control system. The driver may regain control of the vehicle, for example, when another vehicle swerves into the driver's lane, an obstacle lies in front of the vehicle, the vehicle comes into close proximity with a guardrail, the driver switches lanes, or in other circumstances. When a driver encounters a circumstance requiring the driver to regain control of the steering quickly, an automated vehicle steering system override may have to be performed quickly and easily. An automated vehicle steering override detection system may, therefore, be required to function with high precision at low speeds, high speeds, on curved roads, on banked roads and in other driving scenarios. At lower speeds, application of more torque to the wheels may, for example, be required for steering the vehicle than at higher speeds; therefore, the minimum torque required to override the system may be higher at low speeds than high speeds. Conversely, at higher speeds, application of less torque may, for example, be required for steering the vehicle than at lower speeds; therefore, the minimum torque required to override the automated steering control system may be lower at high speeds to ensure the driver may easily regain control of the vehicle if needed.

As a torque is applied by an operator (e.g., driver) of the vehicle so as to override the automated steering control system, the wheels of the vehicle may respond to the operator input (e.g. turning a steering wheel) rather than to input generated by the automated steering control system. If the transition from responding to the automated steering control system to responding to the operator is too sudden, the operator, passenger, or cargo of the vehicle may be subject to a jerking motion or sensation. For example, a jerking sensation may result from an excessively rapid lateral acceleration (rate of change of lateral velocity) and/or from an excessively rapid yaw acceleration (rate of change of a yaw rate) of the vehicle.

According to embodiments of the present invention, an automated vehicle steering control override system may provide for a gradual overriding of the automated steering control system. In order to effect a gradual transition, the transition may be over a time period, rather than all at once. The gradual overriding may be such as to ensure that transition from steering by the automated steering control system to steering by the operator does not cause an uncomfortable or potentially damaging (e.g. to cargo) jerking. For example, the transition may be sufficiently slow as to ensure that a lateral acceleration or a yaw acceleration remain within a predefined comfort range or other range.

A gradual transition in accordance with an embodiment of the present invention may enable a greater override threshold than would be desirable otherwise. A threshold may be referred to in interpreting an action by the vehicle operator so as to decide whether a particular action by the vehicle operator signals an intention to override the automated steering control system. For example, a threshold value may be placed on or may limit a steering torque or steering angle resulting from the operator operating a steering wheel of the vehicle. A torque or steering angle that exceeds the threshold value may, for example, be interpreted as indicating an intention to override. A threshold that is set too low may result in false positive result, where an action by the operator e.g., operator inadvertently bumping the steering wheel or other action) may be mistakenly interpreted as intention to override. On the other hand, increasing the threshold value may result in jerking of the vehicle (e.g., a jerk in vehicle lateral motion) when the transition is sudden. However, when the transition to operator control of the vehicle is gradual, jerking of the vehicle may be reduced or eliminated despite an increased threshold.

In one embodiment of the present invention, a vehicle may be equipped with an adaptive or automatic lane centering feature or application. An adaptive lane centering feature may maintain a constant lane offset or vehicle position relative to a lane on the road the vehicle is driving upon. A computer vision sensor (e.g., a camera), light detection and ranging (LIDAR) sensor, or other type of sensor may measure data allowing an adaptive lane centering feature to determine the lane offset or relative location of the vehicle with respect road features, for example, lane markers(s), road shoulder(s), median barrier(s), edge of the road and other objects or features. The relative location of the vehicle with respect to road features may be determined based on, for example, the global positioning system (GPS) location data and the map database of the vehicle, a forward facing camera measured relative distance to road features, and/or other information. The adaptive lane centering feature may control the vehicle steering based on the determined relative position of the vehicle in order to maintain constant or relatively constant (e.g., with a resolution of 10 cm) vehicle lane offset or position within a lane. The adaptive lane centering feature, in some embodiments, may control the direction of vehicle travel by controlling the steering angle and/or steering torque of the vehicle by outputting a steering angle control command to an electrical power steering (EPS), active front steering (AFS), or other system. The adaptive lane centering feature may, in some embodiments, control the steering angle directly or with or without an EPS, AFS or other system.

In one embodiment of the present invention, a vehicle may be equipped with an automated lane keeping assist application or feature. A lane keeping assist application may automatically control the vehicle steering to ensure that the vehicle stays within a pre-determined lane or path on the road. A lane keeping assist application may, in some embodiments, not control the vehicle steering (e.g., may operate in the background) unless the vehicle begins to move out of a lane, at which point the lane keeping assist system may automatically control the steering to maintain the vehicle within the lane. A lane keeping assist feature may function by determining the relative position of the vehicle with respect to road features (e.g., lane marker(s), road shoulder(s), median barrier(s), or other road features) and adjusting the steering control to maintain the vehicle within a lane. The relative position of the vehicle with respect to road features may be determined based on the GPS location data of the vehicle, vehicle measured relative distance to road features, or other information. The lane keeping assist feature may control the vehicle steering based on the determined relative position of the vehicle in order to maintain the vehicle within a lane. The lane keeping assist feature may control the direction of vehicle travel by controlling the steering angle and/or steering torque of the vehicle by outputting a steering angle and/or steering torque control command to an EPS, an AFS, or other system. The lane keeping assist feature may, in some embodiments, control the steering angle directly or with or without an EPS, AFS or other system.

According to embodiments of the present invention, an automated steering control override system may measure, estimate, or evaluate, using sensor(s) associated with the vehicle, vehicle steering measurements or vehicle steering conditions such as the steering angle and steering torque of a vehicle. Vehicle steering measurements or vehicle steering conditions may be measured, estimated, or evaluated at predetermined intervals (e.g., every 10 milliseconds) while the vehicle is in motion. In some embodiments, automated steering control override detection system may measure steering angle conditions and steering torque conditions of a vehicle continuously while the vehicle is in motion. Other vehicle dynamics information, for example, speed, acceleration, heading, yaw-rate, lane offset, driver input, and other factors may also be measured.

According to embodiments of the present invention, a vehicle automated steering override detection system may determine, based on the measured vehicle steering measurements (e.g., steering torque, steering angle), and/or other information (e.g., speed, acceleration, heading, yaw-rate, other driver input, etc.) of a vehicle, whether to override, deactivate, or disengage an automated vehicle steering control system. Embodiments of the present invention may, for example, be employed while a vehicle automated steering system is engaged, activated or functioning. The vehicle automated steering override detection system may measure the steering angle, steering torque, acceleration, lateral acceleration, longitudinal acceleration, speed, yaw-rate and/or other vehicle dynamics or steering measurements while the vehicle automated steering control system is activated.

According to embodiments of the present invention, an automatic vehicle control system may be activated and may output a steering angle command to an automated steering override detection system. An automated steering override detection system may based on, for example, the steering angle command, calculate an expected steering angle and/or expected steering torque. The automated steering override detection system may compare the expected steering angle and/or expected steering torque to a sensor-measured, e.g., actual steering angle and/or sensor-measured steering torque. If the absolute value of the difference between measured steering torque and the expected steering torque is within an override transition zone, an automated steering control system may be partially disengaged.

The override transition zone may be characterized by a lower boundary and an upper boundary. The lower and upper boundaries may, for example, be functions of vehicle speed or other vehicle dynamics parameters. If the absolute value of the difference between measured steering angle and the expected steering angle is within the override transition zone (e.g. greater than or equal to the lower boundary, and less than or equal to the upper boundary) then an automated steering control system may be disengaged gradually over a period of time, herein referred to as a "transition period." The length of the transition period may, for example, be determined in accordance with predetermined criteria or in accordance with current measured quantities. At the beginning of the transition period, the automated steering control system may completely control steering of the vehicle. Thus at the beginning of the transition period, the vehicle may be steered in a direction that is determined by the automated steering control system. At the end of the transition period, the operator may completely control steering of the vehicle. Thus at the end of the transition period, the vehicle may be steered in a direction that is determined by the operator. During the transition period, steering control may be gradually transferred from the automated steering control system to the operator. Thus, during the transition period, the vehicle may be steered in a direction that is intermediate between the direction determined by the automated steering control system and the direction determined by the operator, and the automated steering control system and the operator may share control or be jointly in control.

In accordance with an embodiment of the invention, if the absolute value of the difference between measured steering angle and the expected steering angle is greater than the override transition zone (e.g. greater than the upper boundary) then the automated steering control system may be disengaged immediately or in a short period of time, with control transferred immediately or in short period of time to the operator.

In one embodiment of the present invention, an automated steering override detection system may gradually disengage an automated steering control system if the absolute value of the difference between measured steering angle and the expected steering angle is within an override transition steering angle zone, and/or the absolute value of the difference between measured torque and the expected steering torque is within an override transition torque zone. In addition to the functional dependence on current vehicle speed, boundaries of steering angle and current torque override transition zones may also depend on, or vary based on, road condition(s), curvature of the road, steering system dynamics, type of vehicle, and/or other factors. Other or different vehicle steering or vehicle dynamics measurements may factor into the decision to override. The terms measurement, parameter, value, and other terms may, in some embodiments, be used interchangeably and have equivalent meaning.

FIG. 1 is a schematic diagram of a vehicle with a vehicle automated steering override detection system according to an embodiment of the present invention. A vehicle 10 (e.g., a car, truck, or another vehicle) may include a vehicle automated steering override detection system 100. Vehicle automated steering override detection system 100 may operate in conjunction with or separate from one or more automatic vehicle control systems, autonomous driving applications or vehicle automated steering systems 90. Vehicle automated steering system 90 may, for example, be an adaptive lane centering, low speed lane centering, lane keeping assist, or other applications. One or more vehicle automated steering system(s) 90 may be component(s) of system 100, or vehicle automated steering system(s) 90 may be separate from system 100. Vehicle automated steering system 90 may, when engaged, fully or partially control the steering of the vehicle and reduce driver (e.g., operator of the vehicle) steering control input via the steering wheel 82 and/or steering system, which may include an electrical power steering (EPS) system and/or other components.

One or more sensor(s) may be attached to or associated with the vehicle 10. A computer vision sensor (e.g., a camera) 24, LIDAR, or laser radar (LADAR), sensor 20, radar sensor 22, an imager, or another remote sensing device may obtain data allowing system 100 to determine the relative location of the vehicle with respect road features, for example, lane markers(s), road shoulder(s), median barrier(s), edge(s) of the road and other objects or features. Camera 24 may, for example, measure lane offset, heading angle, lane curvature and/or other information (e.g., speed, acceleration, yaw-rate, other driver input etc.) and provide the information to system 90. Vehicle automated steering control system 90 may maintain or control the position of a vehicle with respect to the road based on the sensor measured relative location of the vehicle with respect to road features.

In one embodiment of the present invention, vehicle 10 may include one or more devices or sensors to measure vehicle steering measurements, vehicle steering conditions, vehicle steering parameters, vehicle dynamics, driver input, or other vehicle related conditions or measurements. The vehicle dynamics measurement device(s) may include one or more steering angle sensor(s) 70 (e.g., connected to steering wheel 82 and/or another component of the steering system) and/or steering torque sensor(s) 80 (e.g., a torsion bar, torque sensor, torquemeter, torque transducer, or other device). Steering torque sensor(s) 80 may be connected to or associated with steering wheel 82, a steering column, steering rack and pinion, a vehicle axle, and/or another component of the steering system. The vehicle dynamics measurement device(s) may also include one or more accelerometer(s) 72, speedometer(s) 74, wheel speed sensor(s) 76, inertial measurement unit(s) (IMU) 78, or other devices. The vehicle dynamics measurement device(s) may measure vehicle dynamics conditions or driver input including steering angle, steering torque, steering direction, lateral (e.g., angular or centripetal) acceleration, longitudinal acceleration, yaw-rate, lateral and longitudinal velocity, speed, wheel rotation, and other vehicle dynamics characteristics of vehicle 10. The measured vehicle dynamics, vehicle conditions, steering measurements, steering conditions, or driver input information may be transferred to system 100 via, for example, a wire link (e.g., a controller area network bus CAN bus, Flexray link, Ethernet link) 40 or a wireless link. The measured vehicle dynamics, vehicle conditions, steering measurements, steering conditions, or driver input information data may be used by system 100 or another system to calculate steering angle, steering torque, dead reckoning based vehicle position, and other calculations.

In one embodiment of the present invention, vehicle automated steering override detection system 100 may be or may include a computing device mounted on the dashboard of the vehicle, in passenger compartment 50 or in trunk 60. In alternate embodiments, vehicle automated steering override detection system 100 may be located in another part of the vehicle, may be located in multiple parts of the vehicle, or may have all or part of its functionality remotely located (e.g., in a remote server or in a portable computing device such as a cellular telephone).

While various sensors and inputs are discussed, in certain embodiments only a subset (e.g. one) type of sensor or input may be used.

Figure 2:
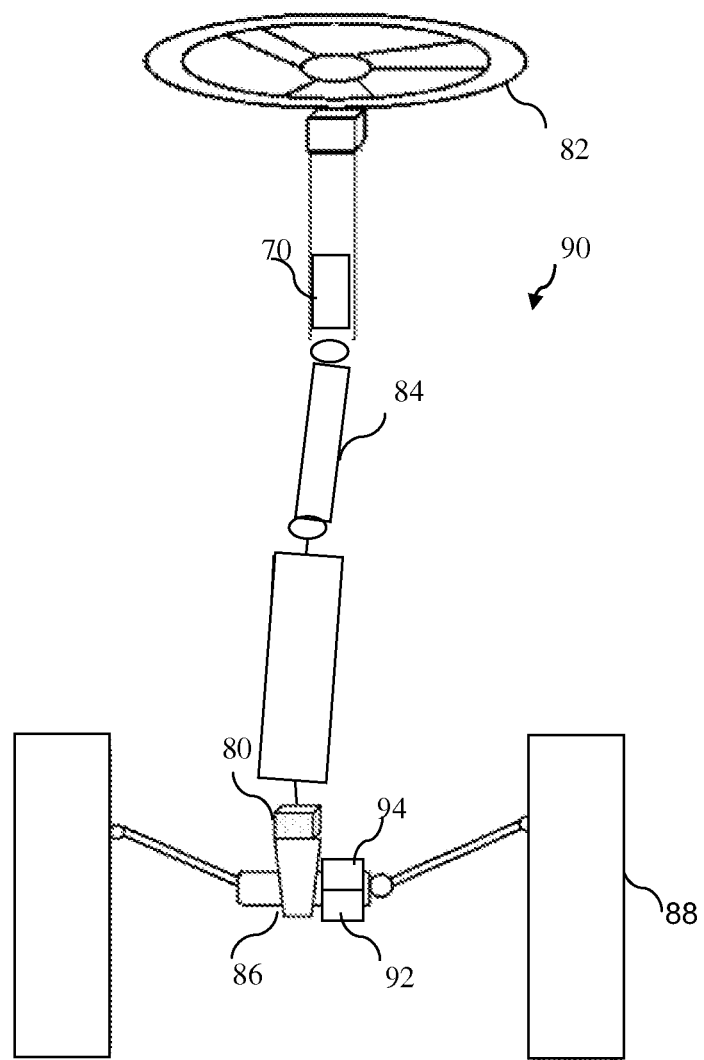
FIG. 2 is a schematic depiction of a vehicle automated steering system according to an embodiment of the present invention.

FIG. 2 is a schematic depiction of a vehicle automated steering system according to an embodiment of the present invention. Vehicle automated steering system 90 may be installed in a vehicle (e.g., a car, an automobile, truck, or another vehicle). System 90 may include a steering wheel 82 connected to a steering column 84. The steering column 84 may be connected to a rack and pinion 86, which converts or transforms the rotary motion of the steering wheel 82 and steering column 84 into linear motion or displacement of the vehicle tires or wheels 88. A steering angle sensor 70 may be mounted to the steering wheel 82, steering column 84, an EPS system 92, AFS system 94, or be otherwise associated with the automated steering control system 90. A steering torque sensor 80 (e.g., steering torsion bar, torque sensor, torquemeter, torque transducer, or other device) may also be mounted to the steering column 84, steering wheel 82, rack and pinion 86, wheel axle or be otherwise associate with the automated steering control system 90. Steering torque sensor 80 and steering angle sensor 70 may, in some embodiments, be associated with or mounted on EPS 92, AFS 94, or other systems.

Figure 3:
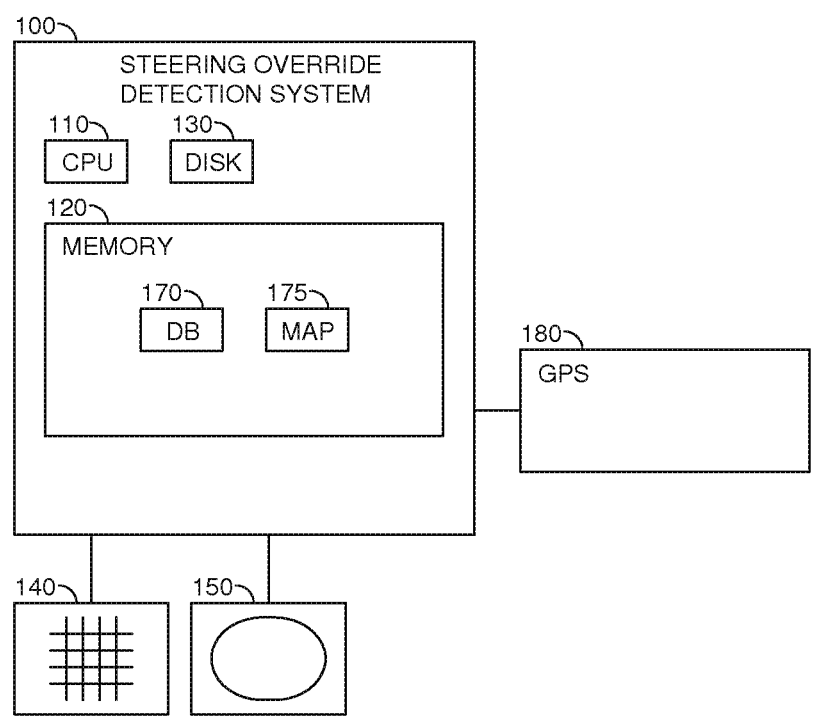
FIG. 3 is a schematic diagram of a vehicle automated steering override detection system according to an embodiment of the present invention.

FIG. 3 is a schematic diagram of a vehicle automated steering override detection system according to an embodiment of the present invention. Autonomous or automated steering override detection system 100 may include one or more processor(s) or controller(s) 110, memory 120, long term storage 130, input device(s) or area(s) 140, and output device(s) or area(s) 150. Input device(s) or area(s) 140 may include, for example, a touch screen, a keyboard, microphone, pointer device, or other device. Output device(s) or area(s) 150 may include, for example, a display, screen, audio device such as speaker or headphones, or other device. Input device(s) or area(s) 140 and output device(s) or area(s) 150 may be combined into, for example, a touch screen display and input which may be part of system 100.

System 100 may include one or more databases 170, which may include, for example, speed ranges, steering angle thresholds, steering torque thresholds, steering inertia information, steering damping information, steering stiffness information, and other information or data. Databases 170 may be stored all or partly in one or both of memory 120, long term storage 130, or another device.

Processor or controller 110 may include, for example, a central processing unit (CPU), a chip or any suitable computing or computational device. Processor or controller 110 may include multiple processors, and may include general-purpose processors and/or dedicated processors such as graphics processing chips. Processor 110 may be configured to execute code or instructions that are stored, for example, in memory 120 or long-term storage 130, so as to carry out embodiments of the present invention.

Memory 120 may be or may include, for example, a Random Access Memory (RAM), a read only memory (ROM), a Dynamic RAM (DRAM), a synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include multiple memory units.

Long term storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 4:
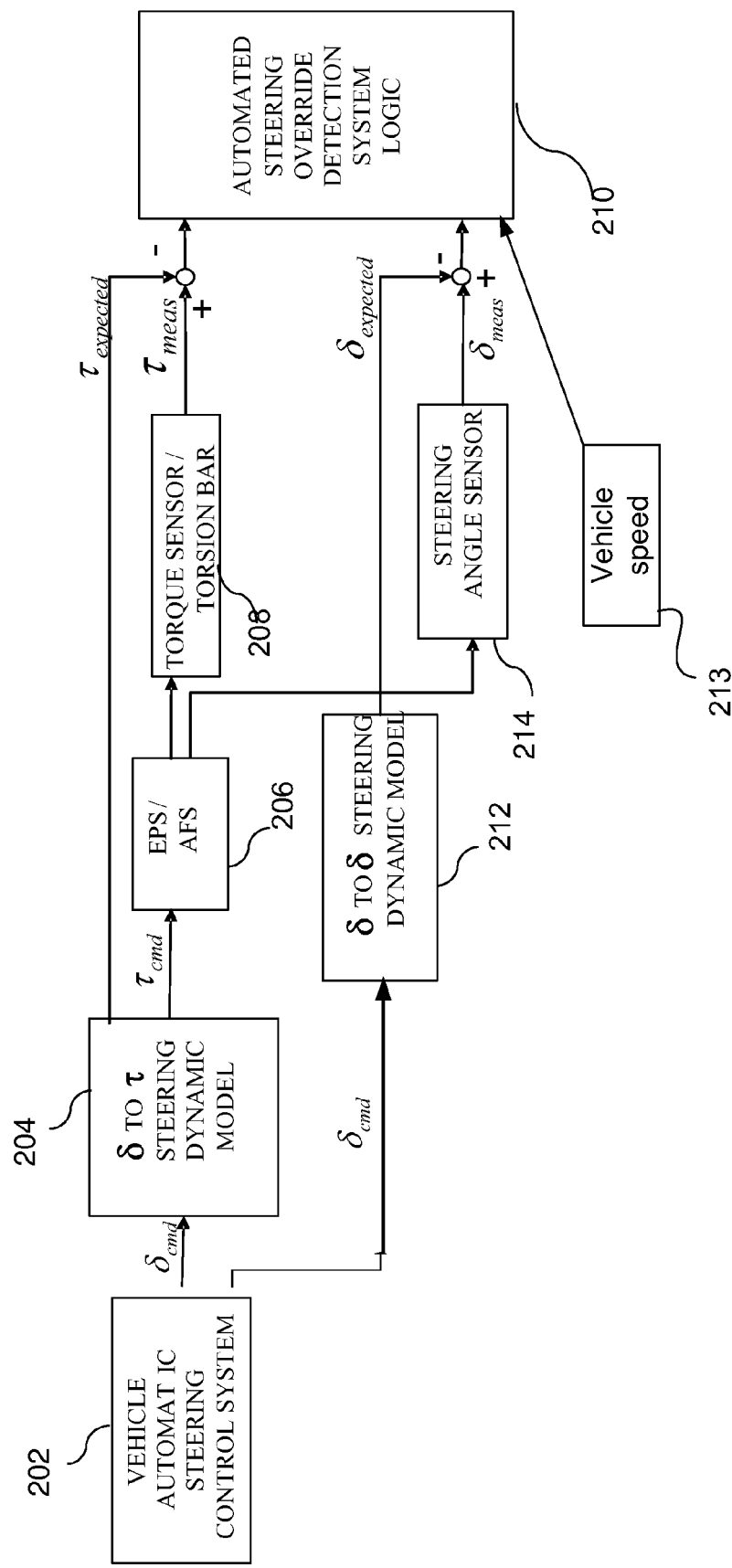
FIG. 4 is a block diagram of a steering override detection system, process, and/or algorithm according to an embodiment of the present invention.

FIG. 4 is a block diagram of a steering override detection system, process, and/or algorithm according to an embodiment of the present invention. As depicted in block 202, a steering angle command, $\delta_{cmd}$, may be output by a vehicle automated steering system 90 (e.g., adaptive lane centering, automated lane centering, or other system). As depicted in block 204, a steering torque command, $\tau_{cmd}$, may be calculated based on the steering angle command, $\delta_{cmd}$, from the vehicle automated steering control system 90.

Steering angle command, $\delta_{cmd}$, may, in some embodiments, be the steering angle change that the vehicle automated control system outputs to a vehicle steering system, motor associated with the vehicle steering system, or other component of vehicle steering system in order to change the direction of the vehicle. Steering torque command, $\tau_{cmd}$, may be the steering torque that automated steering control system 90 outputs to EPS system 92, AFS system 94, or other system to steer and/or change the direction of vehicle. Steering torque command, $\tau_{cmd}$, in some embodiments, be the sum of a driver assist torque and an overlay torque. A driver assist torque may be the torque applied by EPS system 92, AFS system 94, or other system to aid the driver in steering vehicle. Driver assist torque may be zero when a vehicle automated steering system 90 is engaged, and the driver is not steering vehicle 10. An overlay torque may be the torque applied by a vehicle automated steering system 90 in order to actuate the vehicle steering.

Automated steering control may be overridden by operator actions if evaluated vehicle steering conditions and an evaluated speed indicate that the operator of the vehicle is overriding the autonomous driving application. One or more vehicle steering measurements may be made and one or more expected vehicle steering measurements may be calculated, each expected vehicle steering measurement corresponding to one of the measured vehicle steering measurements. For example, the steering measurements may include an applied torque or steering angle. The calculated expected vehicle steering measurements may include, for example, an expected torque or an expected steering angle. At least one difference may be calculated between at least one of the expected vehicle steering measurements and its corresponding measured vehicle steering measurement. Each calculated difference may be compared to boundaries of a corresponding override transition zone. The boundaries or limits of the override transition zone may be calculated thr example on the basis of vehicle speed. One or more of the calculated differences may exceed a lower boundary of the corresponding override transition zone. Depending on the a particular embodiment, exceeding a lower boundary of an override transition zone by one or more of the differences may be interpreted as indicative of an intention by the vehicle operator to override the automated steering control. When such an intention is indicated, control of the vehicle may be gradually transferred to the operator, e.g. during the course of a transition period. Control of the vehicle may, for example, be gradually transferred to operator by reducing the steering torque and/or steering angle applied by automated steering control system. Steering torque and/or steering angle may, for example, be reduced linearly, sinusoidally, exponentially, or according to another function (e.g., a first order, second order, or other order function).

In some embodiments, an expected steering torque, $\tau_{expected}$, and a steering command torque, $\tau_{cmd}$, may be calculated, as illustrated in block 204. Expected steering torque, $\tau_{expected}$, may be the torque that the system 100 expects to be applied to the vehicle steering system or component(s) of the vehicle steering system when the driver or operator of the vehicle is not attempting to override the automated steering control system. Expected steering torque, may be, in some embodiments, the torque that system 100 expects to be output from vehicle automated steering system 90. Expected steering torque, $\tau_{expected}$, may be calculated based on steering angle measured, $\delta_{meas}$, and vehicle steering parameter, constants and/or pre-determined values using a second-order model, approach, or method; a look-up table; or other method or approach. Steering command torque, $\tau_{cmd}$, may be calculated based on steering angle command, $\delta_{cmd}$, using a second-order model, approach, or method; a look-up table; or other method or approach.

Steering command torque, $\tau_{cmd}$, may be input to an EPS system, AFS system or another system, as illustrated in block 206. Steering command torque, $\tau_{cmd}$, may be the torque that a motor associated with the EPS system, AFS system or other system applies to the steering wheel 82, steering column 84, a component of the automated steering control system 90, or another component of the vehicle steering system.

As illustrated in block 208, steering command torque, $\tau_{cmd}$, may be input into the torque sensor 80 (e.g., a torsion bar, torque transducer, or other device). Torque sensor 80 may measure torque applied, to vehicle steering system, $\tau_{meas}$. Torque applied to vehicle steering system or torque measured, $\tau_{meas}$, may, for example, be applied to the steering wheel 82, steering column 84, vehicle axle or another portion of the vehicle steering system or apparatus. Torque applied to the vehicle steering system, $\tau_{meas}$, may include steering command torque, $\tau_{cmd}$, applied by EPS, AFS or another system, and driver inputted torque, $\tau_{driver}$, which may be the amount of torque the driver inputs to steering wheel 82. Steering torque measured, $\tau_{meas}$, may be measured or evaluated by torque sensor 80 (e.g., a torsion bar, torquemeter, torque sensor, or other device), as depicted in block 208. Steering torque measured, $\tau_{meas}$, may include the amount of torque applied to the steering wheel 82 or related system by the driver, for example, to regain full or partial control of the vehicle steering system.

As depicted in block 210, the difference between steering torque measured, $\tau_{meas}$, and expected steering torque, $\tau_{expected}$, may be calculated. If the absolute value or magnitude of the difference is greater than a current lower boundary of an override transition torque zone, an automatic steering control system 90 may be gradually de-activated, disengaged, or overridden by system 100. A current lower boundary may be calculated based on a measured vehicle speed and/or additional vehicle factors. The additional vehicle factors may be determined during or prior to manufacturing of vehicle 10 and may be based on vehicle testing, human factor studies, or other factors. The current lower boundary may include buffer or additional torque so as to take into account driver interaction with the steering system that is not intended to override automatic steering control system 90.

According to embodiments of the present invention, an expected steering angle, $\delta_{expected}$, may be calculated by system 100 based on steering angle command, $\delta_{cmd}$, from the vehicle automated steering control system 90, as illustrated in block 212. Expected steering angle, $\delta_{expected}$, may be the steering angle or maximum steering angle that the system expects to be applied to the vehicle steering system or component(s) of the vehicle steering system when the driver or operator of the vehicle is not attempting to override the automated steering control system. The expected steering angle, $\delta_{expected}$, may be calculated based on steering angle command, $\delta_{cmd}$, using a look-up table, simple second order system, second order system, or other mathematical approach or method. The expected steering angle, $\delta_{expected}$, may, in some embodiments, vary from steering angle command, $\delta_{cmd}$, due to vehicle dynamics and steering control variables (e.g., latency, delay and system lag in the steering control system).

Steering angle sensor 70 may measure the steering angle input applied to vehicle steering system, $\delta_{meas}$, as depicted in block 214. Steering angle input may, for example, be applied to the steering wheel 82, steering column 84, vehicle axle or another portion of the vehicle steering system or apparatus. Steering angle measured, $\delta_{meas}$, may include the steering angle input applied to the vehicle steering system by the EPS, AFS, or other system and the steering angle input applied by the operator of the vehicle (e.g., the driver) to steering wheel 82. Steering angle measured, $\delta_{meas}$, may be measured or evaluated by steering angle sensor(s), as depicted in block 214. Steering angle measured, $\delta_{meas}$, may include the amount of steering angle input applied to the steering wheel 82 or related system by the driver, for example, in order to regain full or partial control of the vehicle steering system.

As depicted in block 210, the difference between steering angle measured, $\delta_{meas}$, and expected steering angle, $\delta_{expected}$, may be calculated. If the absolute value or magnitude of the difference is greater than a current lower boundary of an override transition steering angle zone, an automatic steering control system 90 may be de-activated, disengaged, or overridden by system 100. The a current lower boundary of the override transition steering angle zone may be determined on the basis of vehicle speed 213 of the vehicle. The current lower boundary of an override transition steering angle zone may, for example, be calculated on the basis of factors determined during or prior to manufacturing of vehicle 10. These factors may be based on, for example, vehicle testing, human factor studies, or other factors.

The current lower boundary of an override transition steering angle zone, in some embodiments, may include a buffer or additional steering angle to take into account driver interaction with the steering system that is not intended to override automatic steering control system 90. While in one embodiment two factors (steering torque and steering angle) are used, in other embodiments only one factor, or different factors, may be used.

For example, vehicle speed 213 may be input from speedometer 74, or may be obtained or derived from another measurement or navigation device such as, for example, GPS, radar, or LIDAR. For example, a vehicle speed 213 may be derived, by tracking motion of the vehicle by UPS, or may be measured with respect to a stationary object using radar or LIDAR.

According to some embodiments of the present invention, autonomous steering override detection system 100 may calculate an expected torque, $\tau_{expected}$, (sometimes referred to as $\tau_{EPS}$, the torque output of the EPS motor) using a second-order model approximation or other mathematical approach. In one embodiment the following formula or differential equation may be solved algebraically, numerically, analytically or using another method to calculate expected torque, $\tau_{expected}$:

$$I_{equ}\ddot{\delta}+c_{equ}\dot{\delta}+k_{equ}\delta_{meas}=\tau_{driver}+\tau_{expected}+\tau_{SelfAlign}$$

A second-order model, formula or differential equation, one example of which is represented in the equation above, may be used to calculate the expected torque, $\tau_{expected}$. The expected torque, $\tau_{expected}$, may be calculated, determined, or derived based on the solution of the second-order differential equation. The expected torque, $\tau_{expected}$, may be the only unknown and may be derived based on pre-determined and measured data. The expected torque, $\tau_{expected}$, may be calculated at regular intervals or time steps, for example, every 10 milliseconds or another time period, or may be updated in real-time while the vehicle automated steering control system is engaged.

The terms $I_{equ}$, $c_{equ}$, and $k_{equ}$ may be predetermined constants or parameters. The terms may be determined using un-modeled steering dynamics parameter estimation techniques, during the calibration of the automated vehicle steering control override system 100 in manufacturing, human factor studies, or other methods or approaches. The equivalent steering inertia, $I_{equ}$, may represent a tendency of the steering wheel, automated steering system or other system or device to resist change in rotational acceleration. The equivalent steering damping $c_{equ}$ may represent a tendency of the steering wheel, automated steering system or other system, device, or component to resist change in rotational velocity or speed. The equivalent steering stiffness, $k_{equ}$, may represent resistance of the steering wheel, automated steering system or other system, device or component to displacement. Steering angle velocity, $\dot{\delta}$, may represent a first derivative of steering angle input and may be known and/or constrained by automated steering control override system dynamics, human factor studies, and/or calibration during manufacturing of system 100. Steering angle acceleration, $\ddot{\delta}$, may represent a second derivative of steering angle and may be known and/or constrained by automated steering control override system dynamics, human factor studies, and/or calibration during manufacturing of system 100. The measured steering angle, $\delta_{meas}$, may represent the steering angle measured by steering angle sensor 70 or another device. Driver inputted torque, $\tau_{driver}$, may represent the amount of torque the driver inputs to the steering wheel. In some embodiments, $\tau_{driver}$ may be zero, or another value, if the autonomous steering control system 90 is engaged, and the driver is not interacting with the steering wheel. Self-aligning torque, $\delta_{SelfAlign}$, may represent the automatically generated torque by the vehicle motion, applied to the vehicle steering system with no driver input or input from a vehicle automated steering system 90. With the self-aligning torque, $\tau_{SelfAlign}$, the vehicle may have a tendency to go to straight even without driver's steering torque. Self-aligning torque, $\tau_{SelfAlign}$, may be a function of vehicle speed, steering angle measurements, tire characteristics, and may also depend on factors that are inherent in the design of the vehicle and/or vehicle steering system and which may be quantified during or prior to manufacturing.

Because the expected torque, $\tau_{expected}$, may be calculated by system 100 based on measured vehicle steering measurements and pre-determined constants and may be calculated at regular time intervals, the expected torque, $\tau_{expected}$, may be adjusted by system 100 based on different driving scenarios and/or conditions. The expected torque, $\tau_{expected}$, may, for example, be higher at low speeds than high speeds. System 100 may, for example, calculate a higher expected torque, $\tau_{expected}$, on curved or banked roads than on flat roads depending on the direction of the curve or bank. Vehicle automated steering override detection system 100 may therefore function accurately and precisely at low speeds, high speeds, on banked roads, on curved roads and in other driving scenarios.

Figure 5A:
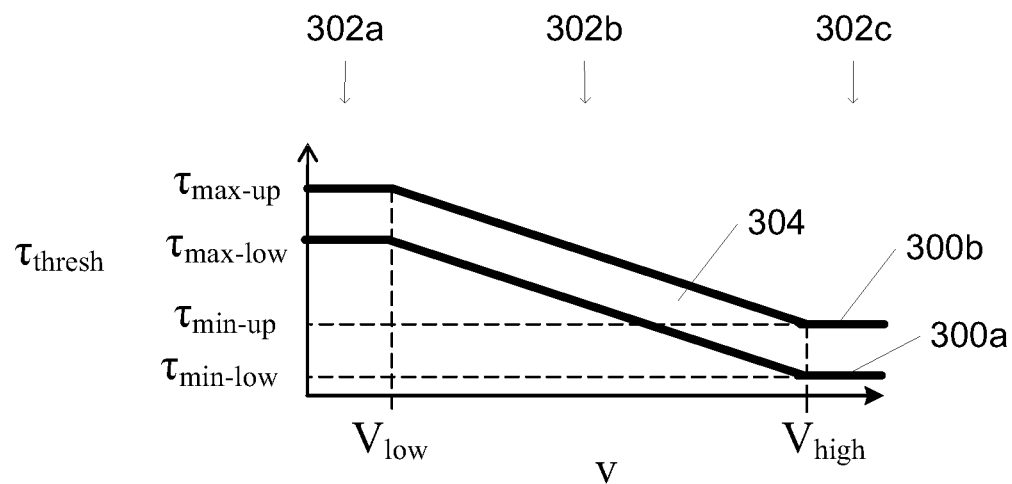
FIG. 5A is a graph illustrating an override transition zone according to an embodiment of file present invention.

FIG. 5A is a graph illustrating an override transition zone according to an embodiment of the present invention. In FIG. 5A, the override transition zone is represented, by way of example, by an override transition torque zone 304. However, an override transition zone may represent steering angle limits, or by limits of another steering characteristic.

Graph segment 300a illustrates a typical dependence of an override transition zone lower boundary torque threshold $\tau_{thresh-low}$ on vehicle speed v (e.g., vehicle longitudinal speed $v_x$). When vehicle speed v is less than or equal to lower speed range boundary $v_{low}$ (sector 302a), lower boundary torque threshold $\tau_{thresh-low}$ may be equal to a constant lower boundary maximum torque $\tau_{max-low}$. For example, lower speed range limit, threshold, or boundary $v_{low}$ may be equal to 5 miles per hour (mph) and lower boundary maximum torque $\tau_{max-low}$ may be equal to 1.8 Newton-meters (Nm) or another value. Similarly, when vehicle speed v is greater than or equal to upper speed range limit, threshold, or boundary $v_{high}$ (sector 302c), lower boundary torque threshold $\tau_{thresh-low}$ may be equal to a constant lower boundary minimum torque $\tau_{min-low}$. For example, upper speed range boundary $v_{high}$ may be 75 mph and lower boundary minimum torque $\tau_{min-low}$ may be equal to 0.8 Nm or another value. Lower boundary maximum torque $\tau_{max-low}$ and lower boundary minimum torque $\tau_{min-low}$ may be determined or adjusted based on such factors as the type of vehicle, previous testing, tuning of the vehicle, or similar vehicle-dependent factors. Other thresholds and ranges may be used.

When vehicle speed v is greater than lower speed range boundary $v_{low}$ and less than upper speed range boundary $v_{high}$, lower boundary torque threshold $\tau_{thresh-low}$ may vary as a function of vehicle speed v. For example, lower boundary torque threshold $\tau_{thresh-low}$ may linearly decline with increasing vehicle speed v from lower boundary maximum torque $\tau_{max-low}$ to lower boundary minimum torque $\tau_{min-low}$ (sector 302b). Such a linear dependence may be expressed as:

$$\tau_{thresh-low} = \frac{\tau_{min-low} - \tau_{max-low}}{v_{high} - v_{low}}(v - v_{low}) + \tau_{max-low}$$

As another example, lower boundary torque threshold $\tau_{thresh-low}$ may decline from lower boundary maximum torque $\tau_{max-low}$ to lower boundary minimum torque $\tau_{min-low}$ as a polynomial (e.g. quadratic or cubic), nth order, logarithmic, sinusoidal, exponential, or other declining function of vehicle speed v in the range between lower speed range boundary $v_{low}$ and upper speed range boundary $v_{high}$. Other thresholds and boundaries may be used.

Graph 300b illustrates a typical dependence of an override transition zone upper boundary torque threshold $\tau_{thresh-up}$ on vehicle speed v (e.g., vehicle longitudinal speed $v_x$). When vehicle speed v is less than or equal to lower speed range boundary $v_{low}$ (sector 302a), upper boundary torque threshold $\tau_{thresh-up}$ may be equal to a constant upper boundary maximum torque $\tau_{max-up}$. For example, lower speed range limit, threshold, or boundary $v_{low}$ may be equal to 5 miles per hour (mph), or another value, and upper boundary maximum torque $\tau_{max-up}$ may be equal to 2.4 Nm or another value. Similarly, when vehicle speed v is greater than or equal to upper speed range limit, threshold, or boundary $v_{high}$ (sector 302c), upper boundary torque threshold $\tau_{thresh-up}$ may be equal to a constant upper boundary minimum torque $\tau_{min-up}$. For example, upper speed range boundary $v_{high}$ may be 75 mph or another value, and upper boundary minimum torque $\tau_{min-up}$ may be equal to 1.2 Nm or another value. Upper boundary maximum torque $\tau_{max-up}$ and upper boundary minimum torque $\tau_{min-up}$ may be determined or adjusted based on such factors as the type of vehicle, previous testing, tuning of the vehicle, or similar vehicle-dependent factors. Other thresholds and ranges may be used.

When vehicle speed v is greater than lower speed range boundary $v_{low}$ and less than upper speed range boundary $v_{high}$, upper boundary torque threshold $\tau_{thresh-up}$ may vary as a function of vehicle speed v. For example, upper boundary torque threshold $\tau_{thresh-up}$ may linearly decline with increasing vehicle speed v from upper boundary maximum torque $\tau_{max-up}$ to upper boundary minimum torque $\tau_{min-up}$ (sector 302b). Such a linear dependence may be expressed as:

$$\tau_{thresh-up} = \frac{\tau_{min-up} - \tau_{max-up}}{v_{high} - v_{low}}(v - v_{low}) + \tau_{max-up}$$

As another example, upper boundary torque threshold $\tau_{thresh-up}$ may decline from upper boundary maximum torque $\tau_{max-up}$ to upper boundary minimum torque $\tau_{min-up}$ as a polynomial (e.g. quadratic or cubic), logarithmic, sinusoidal, exponential, or other declining function of vehicle speed v in the range between lower speed range boundary $v_{low}$ and upper speed range boundary $v_{high}$.

When a steering torque applied by a vehicle operator is greater than the upper boundary torque threshold $\tau_{thresh-up}$ represented by graph 300b (depending on vehicle speed v), control over steering may be completely transferred immediately (e.g., without a gradual transition over a period of time) from an automated steering control system to the operator.

Figure 5B:
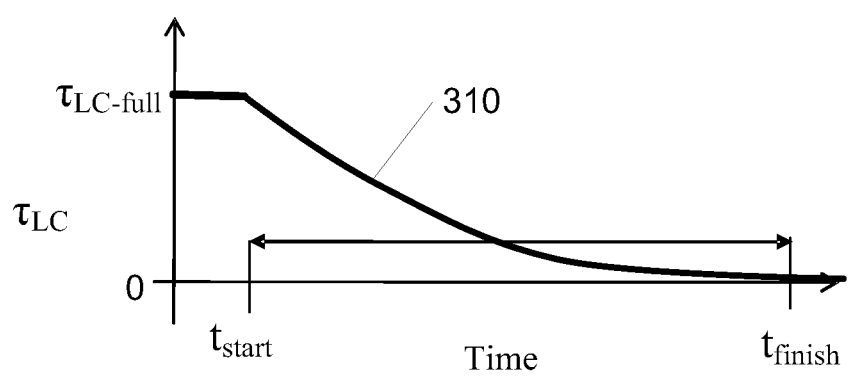
FIG. 5B is a graph illustrating gradual transfer of steering control from an automated steering control system to an operator of a vehicle according to an embodiment of the invention.

Override transition torque zone 304 is bounded by the lower boundary torque threshold $\tau_{thresh-low}$ represented by graph 300a and the upper boundary torque threshold $\tau_{thresh-up}$ represented by graph 300b. When a steering torque applied by a vehicle operator is within override transition torque zone 304 (depending on vehicle speed v), control over steering (e.g., control of vehicle steering) may be gradually transferred from an automated steering control system to the operator. The period of time for transition may, in some embodiments, be lower the greater the torque applied by the driver is over the lower boundary. Thus, the period of time for transfer may be lower when a calculated difference between an expected vehicle steering measurement and a measured steering measurement lies above the lower boundary; the more the difference lies above, the shorter the transition time FIG. 5B is a graph illustrating gradual transfer of steering control from an automated steering control system to an operator of a vehicle according to an embodiment of the invention. Steering control by the automated steering control system is represented by LC torque $\tau_{LC}$ that is applied by a lane centering (LC) system. However, steering control may be gradually transferred from any automated steering control system to the operator.

As illustrated in FIG. 5B, at start time $t_{start}$ control begins to be transferred from an LC system to an operator. For example, at start time $t_{start}$ a torque may have been applied by the operator that exceeded the lower boundary torque threshold $\tau_{thresh-low}$ for the current velocity v. At start time $t_{start}$, vehicle steering is completely controlled by the LC system, which applies a full LC torque $\tau_{LC-full}$ to the vehicle steering. Between start time start time $t_{start}$ and finish time $t_{finish}$, LC torque $\tau_{LC}$ may gradually diminish to substantially equal to 0, as described by graph 310. For example, graph 310 may describe LC torque $\tau_{LC}$ diminishing from full LC torque $\tau_{LC-full}$ as an exponential function, in another embodiment, graph 310 may describe another asymptotic or other gradually diminishing function.

A form of graph 310 may be calculated so as to ensure the vehicle motion does not deviate from predetermined limits of vehicle motion. For example, the predetermined limits may be selected in accordance with comfort criteria for passengers of the vehicle, or requirements for preventing undesirable motion of a cargo in the vehicle. The period of time for transferring steering control may be selected such that a characteristic of motion of the vehicle (e.g. a lateral acceleration or a yaw acceleration) does not deviate from a predetermined vehicle motion criterion.

Figure 6:
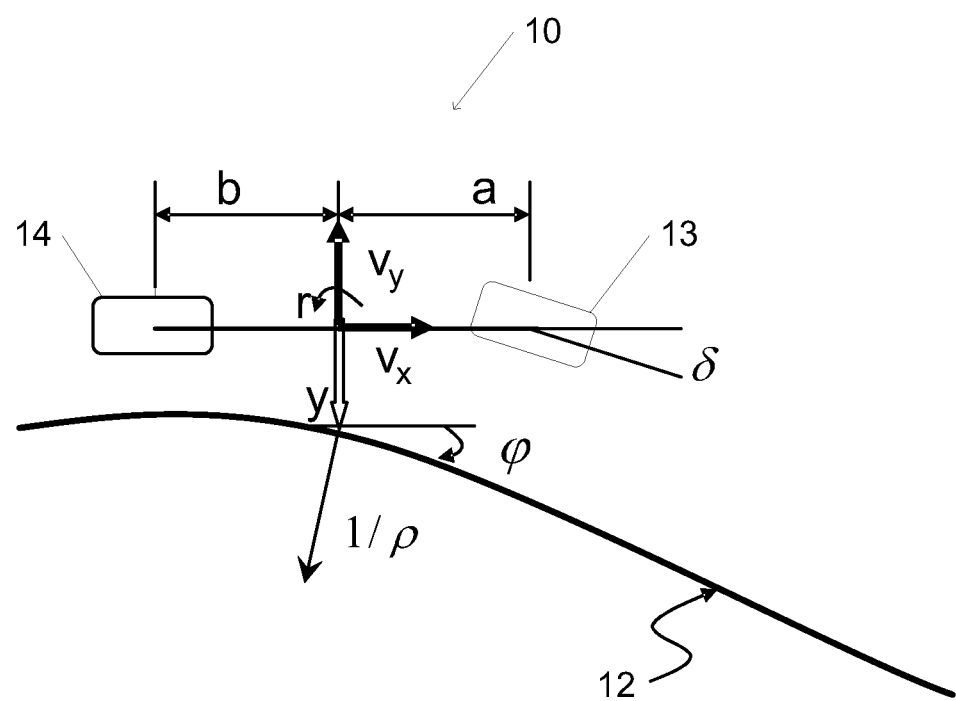
FIG. 6 is a schematic diagram of a lane centering vehicle dynamic model of a vehicle according to an embodiment of the invention.

FIG. 6 is a schematic diagram of a lane centering vehicle dynamic model of a vehicle according to an embodiment of the invention. Vehicle 10 (indicated schematically by front wheel 13 at longitudinal distance a from the center of vehicle 10 to the front wheel center and by rear wheel 14 at longitudinal distance b from the center of vehicle 10 to the rear wheel center) may be traveling with longitudinal speed $v_x$ and lateral speed $v_y$ along a lane whose lane center 12 has curvature ρ. Vehicle 10 is offset from lane center 12 by lateral offset y. Orientation angle φ describes an angle between lane center 12 and the longitudinal direction x of the vehicle. Vehicle 10 may be characterized by mass m and (moment of) inertia I, and may be changing its orientation with a yaw rate r (e.g. measurable by a rate gyro, IMU 78, or other device). Steering angle δ (e.g., measurable using steering angle sensor(s) 70 or other sensor) may represent an orientation of front tire 13 relative to the longitudinal direction.

Quantities related to vehicle lateral dynamics may be related to driving comfort of an operator (e.g., driver), passenger, or other occupant of the vehicle, in particular the rate of change of $\dot{v}_y$ of lateral speed $v_y$ (lateral acceleration), and the rate of change $\dot{r}$ of yaw rate r (yaw acceleration). For example, a comfort requirement may preclude a lateral acceleration greater than a predetermined acceleration. For example, a predetermined lateral acceleration limit may be 0.13 g or another value. A similar limit may be applied to yaw acceleration $\dot{r}$. A gradual transition of steering control may be designed to ensure that a predetermined limit, such as a predetermined lateral acceleration limit, is not exceeded. For example, an automated steering control system may retain sufficient steering control to moderate the operator's actions so as to ensure that such a predetermined limit is not exceeded.

The rates of change $\dot{v}_y$ of lateral speed $v_y$ (or lateral acceleration $\dot{v}_y$) and $\dot{r}$ of yaw rate r (yaw acceleration), as well as the rates of change $\dot{y}$ of lateral offset y and $\dot{\varphi}$ of lane orientation angle $\varphi$ with respect to the vehicle longitudinal direction, may be related by a set of vehicle lateral dynamics equations. The minimum time period $T_{release}$ for transferring steering control from the automated steering control system to the operator may be determined or calculated using equations such as:

$$\begin{bmatrix} \dot{y} \\ \dot{\varphi} \\ \dot{v}_y \\ \dot{r} \end{bmatrix} = \begin{bmatrix} 0 & v_x & 1 & 0 \\ 0 & 0 & 0 & 1 \\ 0 & 0 & -\frac{C_f + C_r}{mv_x} & \frac{bC_r - aC_f}{mv_x} - v_x \\ 0 & 0 & \frac{bC_r - aC_f}{Iv_x} & \frac{a^2C_f + b^2C_r}{Iv_x} \end{bmatrix} \cdot \begin{bmatrix} y \\ \varphi \\ v_y \\ r \end{bmatrix} + \begin{bmatrix} 0 \\ 0 \\ \frac{C_f}{m} \\ \frac{aC_f}{I} \end{bmatrix} \cdot \delta + \begin{bmatrix} 0 \\ v_x \\ 0 \\ 0 \end{bmatrix} \cdot \rho$$

Thus, lateral acceleration $\dot{v}_y$ may be a function of steering angle $\delta$, which, as described above, is related to applied torque. Cornering stiffness of the front wheels may be represented by $C_f$ and cornering stiffness of the rear wheels may be represented by $C_r$. Solving the equations may thus provide a function (e.g. exponential function) that describes the torque as a function of time such that lateral acceleration $\dot{v}_y$ or yaw acceleration $\dot{r}$ does not exceed a predetermined limit. Analysis of the function may thus give a minimum amount of time required $T_{release}$ (e.g., a "release time") for transferring steering control from the automated steering control system to the operator (e.g. who may be applying a greater torque than the automated steering control system) so that the predetermined limit is not exceeded. Other variables, vehicle dynamics parameters, and mathematical approaches may be used.

Figure 7:
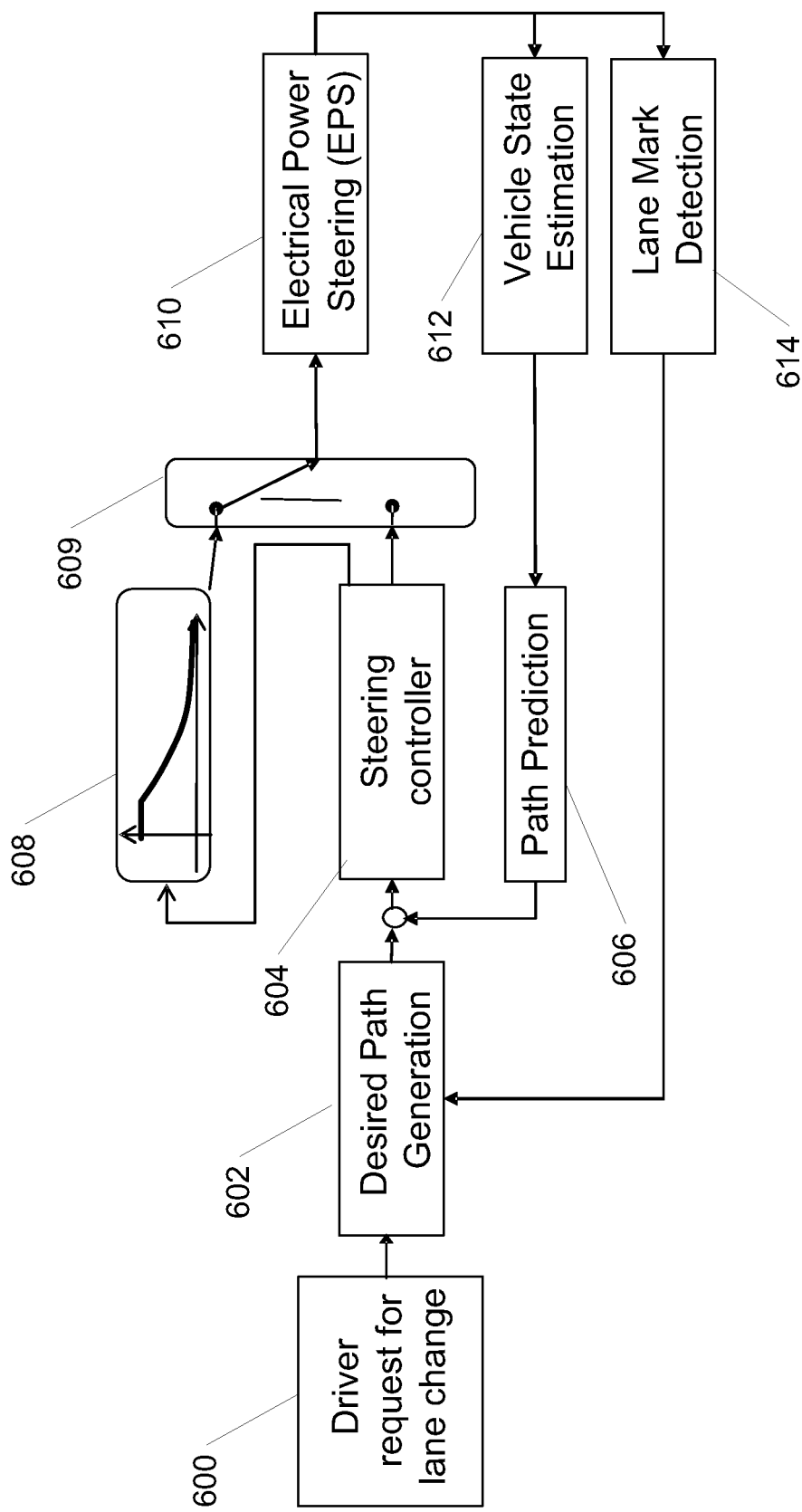
FIG. 7 illustrates a system for automatic lane changing in accordance with an embodiment of the invention.

FIG. 7 illustrates a system for automatic lane changing in accordance with an embodiment of the invention. A driver request 600 for a lane change may be entered (e.g. via a driver-operated control, button, switch, etc.). A path generation module 602 may calculate a desired path, using input from a lane mark detection module (614). The desired path may be input into steering controller module 604, in addition, a current path prediction from a current path prediction module 606 (in turn using input from vehicle state estimation module 612) may be input into steering controller module 604. Decision module 609 may determine to what extent a steering control generated by steering controller module 604 is to control EPS 610, and to what extent a driver action is to control EPS 610. For example, decision module 609 may include input for gradual transition module 608. For example, gradual transition module 608 may apply a gradual transition as described above to maintain lateral acceleration or yaw acceleration within a predetermined range.

Figure 8:
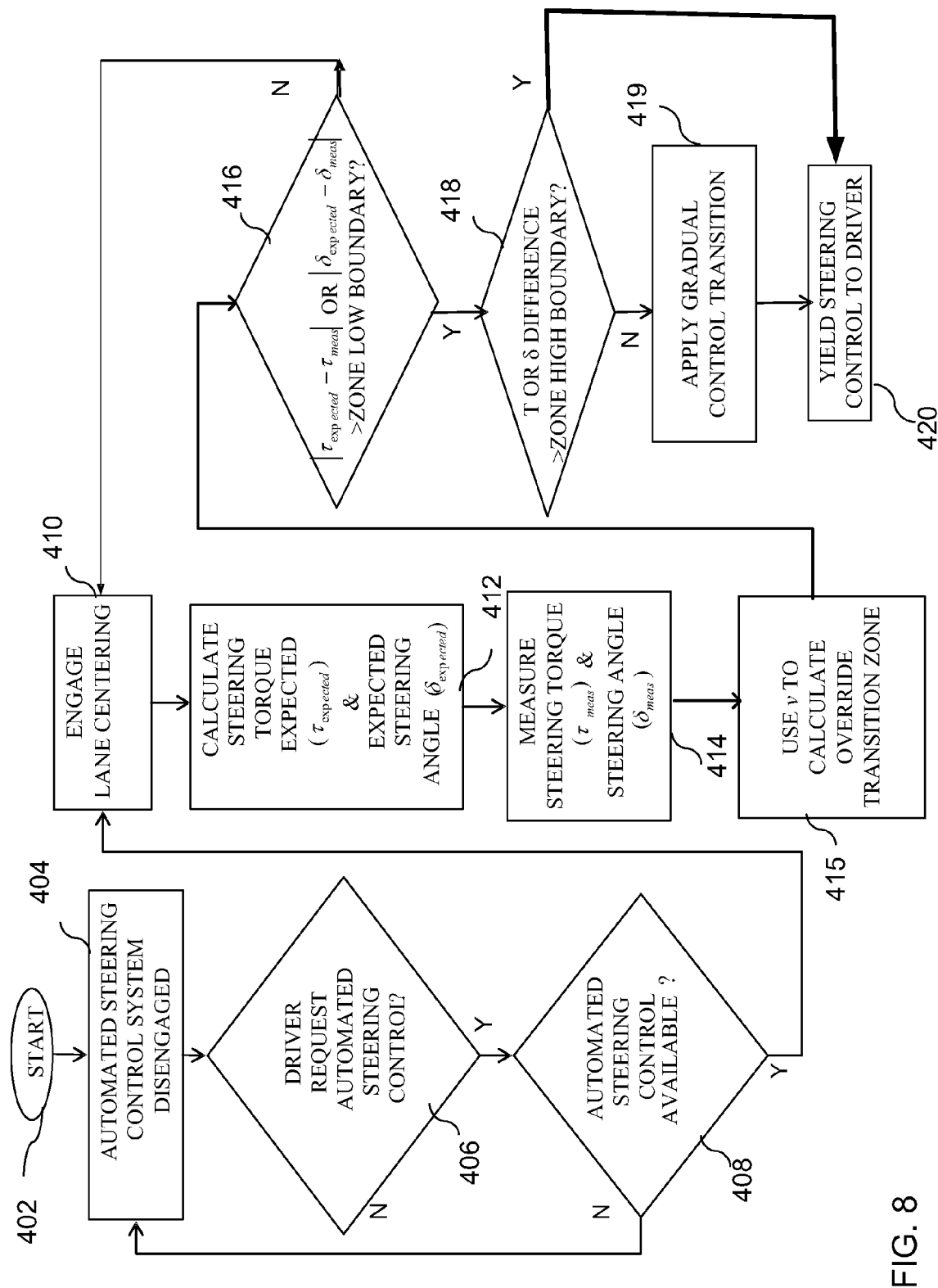
FIG. 8 is a flowchart of a method according to an embodiment of the present invention.

FIG. 8 is a flowchart of a method according to an embodiment of the invention. The operations may be carried out by vehicle automated steering override detection system 100 or by other systems associated with or separate from vehicle 10.

It should be understood with respect to this flowchart and all flowcharts referenced herein that, unless stated to the contrary, the order of blocks is selected for the purposes of convenience and clarity only. Operations represented by blocks of the flowchart may be performed in a different order or concurrently with equivalent results. All such alternative ordering of the operations should be understood as included within embodiments of the invention.

As depicted in blocks 402 and 404, the system or process may be initiated when the vehicle automated steering control system 90 is not engaged or activated. As illustrated by block 406, an action (e.g., a push of a button, activation of a switch, etc.) may be performed by a driver to engage an automated steering control system 90. As illustrated in block 408, it may be determined by system 90 whether the automated steering control system is available and may be activated. As depicted in block 410, if automated steering control system 90 is available, the system may be engaged. When engaged, the automated steering control system 90 may then automatically control the direction and/or heading of vehicle travel. As depicted in block 412, at any time while the automated steering control system 90 is engaged, steering torque expected, $\tau_{expected}$, and steering angle expected, $\delta_{expected}$, may be calculated, determined, or formulated by system 100. Steering torque expected, $\tau_{expected}$, and steering angle expected, $\delta_{expected}$, may be calculated using a second order model, a simple second order model, the solution to a differential equation, a look-up table, a linear transformation or other mathematical model or approach. Steering torque expected, $\tau_{expected}$, and steering angle expected, $\delta_{expected}$, may be calculated at regular intervals (e.g., every 10 milliseconds or another time period) or may be calculated continuously by system 100 while automated steering control system 90 is engaged. As illustrated in block 414, vehicle may evaluate a plurality of vehicle steering conditions using a plurality of sensors associated with vehicle 10. For example, steering torque, $\tau_{meas}$, and steering angle, $\delta_{meas}$, may be evaluated or measured by system 100 using one or more sensor(s) associated with vehicle 10. Steering torque measured, $\tau_{meas}$, and steering angle measured, $\delta_{meas}$, may be measured or evaluated at regular intervals (e.g., every 10 milliseconds or another time period) or may be measured continuously by system 100 while automated steering control system 90 is engaged.

As illustrated in block 415, current boundaries of an override transition torque zone may be calculated on the basis of a measured value of vehicle speed v (e.g. a longitudinal speed). For example, vehicle speed v may be obtained or received by system 100 from speedometer 74 (or obtained or derived from another measurement or navigation device such as, for example, GPS, radar, or LIDAR).

Calculation of current boundaries of the override transition torque zone may be based, for example, on a lookup table. For example, a lookup table may be stored in memory 120 or in disk 130. Alternatively, calculation of current boundaries of an override transition torque zone may be based on a numerical calculation based on a predetermined functional relationship between current boundaries of an override transition zone and vehicle speed v. For example, a numerical calculation may be performed by processor 110 based on parameters or coefficients stored in memory 120 or in disk 130. Other methods or mathematical approaches may be used.

Similarly, calculation of current boundaries of an override transition steering angle zone may be based on a lookup table. For example, a lookup table may be stored in memory 120 or in disk 130. Alternatively, calculation of current boundaries of the override transition steering angle zone may be based on a numerical calculation based on a predetermined functional relationship between current boundaries of the override transition steering angle zone and vehicle speed v. For example, a numerical calculation may be performed by processor 110 based on parameters or coefficients stored in memory 120 or in disk 130. Other methods or mathematical approaches may be used.

As illustrated in block 416, the difference between steering torque expected, $\tau_{expected}$, and steering torque measured, $\tau_{meas}$, may be calculated by system 100. The difference between steering torque expected, $\tau_{expected}$, and steering torque measured, $\tau_{meas}$, may, for example, be a measure of how much control or input driver is applying or attempting to apply to the vehicle. The difference between steering torque expected, $\tau_{expected}$, and steering torque measured, $\tau_{meas}$, may be compared to a lower boundary of the override transition torque zone by system 100. In one embodiment, the absolute value of the difference between steering torque expected, $\tau_{expected}$, and steering torque measured, $\tau_{meas}$, may be compared to the lower boundary of the override transition torque zone by system 100. If the difference between steering torque expected, $\tau_{expected}$, and steering torque measured, $\tau_{meas}$, or the absolute value of the difference, is greater than the lower boundary of the override transition torque zone, the calculated difference (e.g. its absolute value) may be compared with the upper boundary of the override transition torque zone, as depicted in block 418. If the calculated difference is less than the upper boundary of the override transition torque zone a gradual control transition from the automated steering control system 90 to the driver may be applied (e.g., by system 100), as depicted in block 419. Steering control may be fully or partially relinquished to the driver, as depicted by block 420. If the calculated difference is greater than the upper boundary of the override transition torque zone, steering control may be fully or partially relinquished to the driver, as depicted by block 420 without applying the gradual control transition.

Similarly, as illustrated in block 416, the difference between steering angle expected, $\tau_{expected}$, and steering angle measured, $\tau_{meas}$, may be calculated by system 100. The difference between steering angle expected, $\delta_{expected}$, and steering angle measured, $\delta_{meas}$, may be compared to a lower boundary of the override transition steering angle zone by system 100. The difference between steering angle expected, $\delta_{expected}$, and steering angle measured, $\delta_{meas}$, may, for example, be a measure of how much control or input driver is applying or attempting to apply to the vehicle. In one embodiment, the absolute value of the difference between steering angle expected, $\delta_{expected}$, and steering angle measured, $\delta_{meas}$, may be compared to the lower boundary of the override transition steering angle zone by system 100. If the difference between steering angle expected, $\delta_{expected}$, and steering angle measured, $\delta_{meas}$, or the absolute value of the difference, is greater than the lower boundary of the override transition steering angle zone, the calculated difference (e.g. its absolute value) may be compared with the upper boundary of the override transition steering angle zone, as depicted in block 418. If the calculated difference is less than the upper boundary of the override transition steering angle zone a gradual control transition from the automated steering control system 90 to the driver may be applied (e.g., by system 100), as depicted in block 419. Steering control may be fully or partially relinquished to the driver, as depicted by block 420. If the calculated difference is greater than the upper boundary of the override transition steering angle zone, steering control may be fully or partially relinquished to the driver, as depicted by block 420 without applying the gradual control transition. Steering measurements other than steering torque or steering angle may be used. How gradual the transition is, or how long the transition is (e.g., the duration of the transition), may be affected by how much above a lower boundary the driver causes the difference to be.

According to some embodiments of the present invention, both the difference between steering torque expected, $\tau_{expected}$, and steering torque measured, $\tau_{meas}$, and the difference between steering angle expected, $\delta_{expected}$, and steering angle measured, $\delta_{meas}$, may be calculated by system 100 and compared with boundaries of the corresponding override transition zone. In accordance with other embodiments, one or the other difference (or a difference of another quantity related to steering) may be calculated and compared with boundaries of a corresponding override transition zone.

In accordance with some embodiments of the invention, a decision to apply gradual steering control transition as depicted by block 419, or to fully or partially relinquish steering control to the driver as depicted by block 420, may be based on both conditions represented by block 416 or block 418. In accordance with other embodiments of the invention, a decision to apply gradual steering control transition as depicted by block 419, or to fully or partially relinquish steering control to the driver as depicted by block 420, may be based on either of the conditions represented by block 416 or block 418. In accordance with other embodiments of the invention, a decision to apply gradual steering control transition as depicted by block 419, or to fully or partially relinquish steering control to the driver as depicted by block 420, may be based on one or the other of the conditions represented by block 416 or block 418, irrespective of the other condition (for example, the condition with regard to torque or steering angle indicated by either block 416 or by block 418 may be ignored or omitted).

In accordance with an embodiment of the invention, a condition may include comparing a difference between a measured and expected value of a quantity that is relatable to, or derivable from, a torque or steering angle, or another steering or steering control related parameter, to a speed-dependent threshold value. Parameters other than torque and angle may be used.

An alert, indication, alarm or signal may be provided to the driver by system 100 prior to or after disengaging and/or de-activating the automated steering control system 90. The alert may be, for example, an audible alert, light, signal, notification or other form of alert.

Other or different series of operations may be used.

Figure 9:
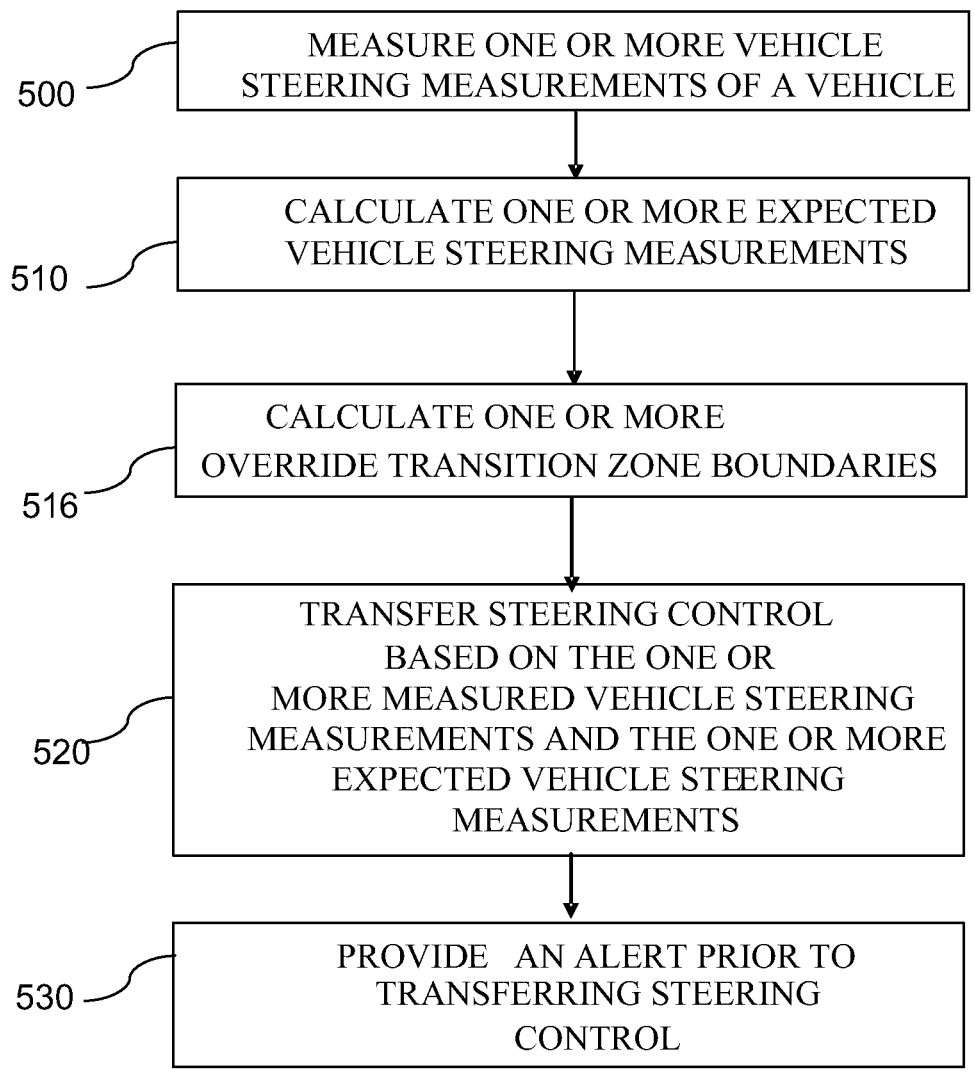
FIG. 9 is a flowchart of a method according to an embodiment of the present invention.

FIG. 9 is a flowchart of a method according to an embodiment of the present invention.

In operation 500, one or more vehicle steering measurements of a vehicle may be measured. The one or more vehicle steering measurements may, for example, be measured by steering angle sensor (e.g., steering angle sensor 70 in FIG. 1), steering torque sensor (e.g., a torsion bar, torsion sensor, or steering torque sensor 80 in FIG. 1), or other device.

In operation 510, one or more expected vehicle steering measurements may be calculated based on the one or more measured vehicle steering measurements. The one or more expected vehicle steering measurements may, for example, be calculated using a second order system mathematical approach, look-up table, or other method or approach.

In operation 516, one or more override transition zone boundaries (e.g. an override transition torque zone upper or lower boundary, or an override transition steering angle zone upper or lower boundary) may be adjusted, set, or calculated. The calculation may be based on a measured or derived vehicle speed (e.g. measured by a speedometer 74 in FIG. 1, or obtained or derived from another measurement or navigation device such as, for example, UPS, radar, or LIDAR). For example, a GPS measurement (or series of GPS measurements) may indicate a speed of the vehicle. A radar or LIDAR measurement (or series of measurements) of a stationary object may indicate a speed of the vehicle with respect to the stationary object. Each of the override transition zone boundaries may correspond to one of the measured vehicle steering measurements and a corresponding calculated expected vehicle steering measurement.

In operation 520, steering control of the vehicle may be transferred from an automatic vehicle control system (e.g., system 90 in to the driver. A decision whether or not to transfer steering control, and at what rate, may be based on the one or more measured vehicle steering measurements and the one or more expected vehicle steering measurements. The length of time of the transfer of steering control (e.g., long corresponding to gradual or short corresponding to sudden) may be determined by a calculation based on the one or more measured vehicle steering measurements and the one or more expected vehicle steering measurements. The length of time may be fixed or predetermined for the case that a calculated difference is at or just above a lower boundary, but may be decreased as the difference rises above the lower boundary. For example, a difference between one of the measured vehicle steering measurements and a corresponding calculated expected vehicle steering measurement may be measured, and this may be compared to the corresponding more override transition zone boundaries. For example, system 100 may send a signal or command to system 90 to transfer steering control from the automatic steering system to the driver. The one or more vehicle steering measurements may include a vehicle steering angle measurement, vehicle steering torque measurement, steering angle condition, steering torque condition, vehicle yaw-rate, vehicle lateral acceleration, vehicle longitudinal acceleration, or other vehicle dynamics measurements. A calculation of a transfer rate or period of time may include predetermined limitations on vehicle motion (e.g. lateral acceleration or yaw acceleration).

In operation 530, system 100 may provide an alert prior to transferring steering control from the automatic vehicle control system 90 to the driver. The alert may be issued, for example, to a driver or to a vehicle automatic steering control system 90. The alert may inform the driver that the automatic steering control system 90 may be disengaged.

Other or different series of operations may be used.

Embodiments of the present invention may include apparatuses for performing the operations described herein. Such apparatuses may be specially constructed for the desired purposes, or may include computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Features of various embodiments discussed herein may be used with other embodiments discussed herein. The foregoing description of the embodiments of the invention has been presented thr the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method comprising:
   measuring, by a processor, one or more vehicle steering measurements of a vehicle;
   calculating, by the processor, one or more expected vehicle steering measurements, each calculated expected vehicle steering measurement corresponding to one of the measured vehicle steering measurements;
   calculating, by the processor, an absolute value difference between one of the measured vehicle steering measurements and its corresponding calculated expected vehicle steering measurement;
   calculating, by the processor, a lower boundary and an upper boundary of at least one override transition zone, each of the override transition zones corresponding to one of the measured vehicle steering measurements and its corresponding calculated expected vehicle steering measurement, wherein the lower boundary includes a buffer to take into account driver interaction that is not intended to override an automatic vehicle control system;
   comparing the calculated absolute value difference to the calculated lower boundary and the calculated upper boundary of the at least one override transition zone;
   transferring, by the processor, steering control of the vehicle from an automatic vehicle control system to a driver of the vehicle with a gradual transition over a predetermined period of time when the calculated absolute value difference lies between the calculated lower boundary and the calculated upper boundary of the corresponding override transition zone; and
   transferring, by the processor, steering control of the vehicle from an automatic vehicle control system to a driver of the vehicle without a gradual transition when the calculated absolute value difference lies above the calculated upper boundary of the corresponding override transition zone.

2. The method of claim 1, wherein the calculated lower boundary or the calculated upper boundary declines in value as a measured speed of the vehicle increases.

3. The method of claim 1, wherein the one or more vehicle steering measurements comprises a vehicle steering angle measurement.

4. The method of claim 1, wherein the one or more vehicle steering measurements comprises a vehicle steering torque measurement.

5. The method of claim 1, wherein the period of time is selected such that a characteristic of motion of the vehicle does not deviate from a predetermined vehicle motion criterion.

6. The method of claim 5, wherein the predetermined motion criterion comprises an upper limit on lateral acceleration or an upper limit on yaw acceleration.

7. The method of claim 1, wherein the steering control by the automatic vehicle control system is reduced in accordance with an exponential function of time.

8. The method of claim 1, wherein the vehicle automated steering system comprises an adaptive lane centering system.

9. The method of claim 1, comprising providing an alert prior to transferring steering control.

10. A system comprising:
a vehicle automated steering system;
one or more sensors; and
a controller to:
measure one or more vehicle steering measurements of a vehicle;
calculate one or more expected vehicle steering measurements, each calculated expected vehicle steering measurement corresponding to one of the measured vehicle steering measurements;
calculate at least one difference between one of the measured vehicle steering measurements and its corresponding calculated expected vehicle steering measurement;
calculate a lower boundary and an upper boundary of at least one override transition zone, each of the override transition zones corresponding to one of the measured vehicle steering measurements and its corresponding calculated expected vehicle steering measurement, wherein the lower boundary includes a buffer to take into account driver interaction that is not intended to override an automatic vehicle control system;
compare the calculated absolute value difference to the calculated lower boundary and the calculated upper boundary of the at least one override transition zone;
transfer steering control of the vehicle from an automatic vehicle control system to a driver of the vehicle with a gradual transition over a period of time when one or more of said at least one calculated difference lies between the calculated lower boundary and the calculated upper boundary of the corresponding override transition zone; and
transfer steering control of the vehicle from an automatic vehicle control system to a driver of the vehicle without a gradual transition when the calculated absolute value difference lies above the calculated upper boundary of the corresponding override transition zone.

11. The system of claim 10, wherein the calculated lower boundary or the calculated upper boundary declines in value as a measured speed of the vehicle increases.

12. The system of claim 10, wherein the one or more vehicle steering measurements comprises a steering angle measurement.

13. The system of claim 10, wherein the one or more vehicle steering measurements comprises a steering torque measurement.

14. The system of claim 10, wherein the vehicle automated steering system comprises an adaptive lane centering system.

15. The system of claim 10, wherein the controller provides an alert prior to transferring steering control.

16. The system of claim 10, wherein the period of time is selected such that a characteristic of motion of the vehicle does not deviate from a predetermined vehicle motion criterion.

17. The system of claim 16, wherein the predetermined motion criterion comprises an upper limit on lateral acceleration or an upper limit on yaw acceleration.

18. The system of claim 11, wherein the sensors comprise a sensor for measuring a speed of the vehicle.

* * * * *